United States Patent [19]

Nied et al.

[11] Patent Number: 4,943,224

[45] Date of Patent: Jul. 24, 1990

[54] APPARATUS EMPLOYING INTEGRAL DIELECTRIC HEATER FOR ROLL FORMING THERMOPLASTIC MATERIAL

[75] Inventors: Herman F. Nied, Clifton Park; Louis P. Inzinna, Scotia, both of N.Y.

[73] Assignee: General Electric Company, Schenectady, N.Y.

[21] Appl. No.: 308,495

[22] Filed: Feb. 10, 1989

[51] Int. Cl.$^5$ .............................................. B29C 35/14
[52] U.S. Cl. ................................ 425/174.8 R; 264/26; 264/175; 425/174; 425/369
[58] Field of Search .................. 425/174, 174.4, 174.6, 425/174.8 R, 174.8 E, 363, 369; 29/116.1, 116.2; 219/470; 264/26, 175

[56] References Cited

U.S. PATENT DOCUMENTS

| | | | |
|---|---|---|---|
| Re. 29,072 | 12/1976 | Zondek | 114/222 |
| 2,373,035 | 4/1945 | Land | 350/396 |
| 2,415,025 | 1/1947 | Grell et al. | 65/DIG. 4 |
| 2,420,119 | 5/1947 | Boehm et al. | 264/339 |
| 2,529,863 | 11/1950 | Bowen | 425/174.8 |
| 2,897,546 | 8/1959 | Clapp et al. | 264/339 |
| 3,889,348 | 6/1975 | Lemelson | 428/608 |
| 4,044,188 | 8/1977 | Segal | 428/283 |
| 4,179,252 | 12/1979 | Seufert | 425/174.6 |
| 4,229,201 | 10/1980 | Comperatore et al. | 65/290 |
| 4,244,683 | 1/1981 | Rowland | 425/143 |
| 4,268,465 | 5/1981 | Suh et al. | 264/25 |
| 4,282,638 | 8/1981 | Christ et al. | 29/116.2 |
| 4,407,646 | 10/1983 | Bricot et al. | 425/174.4 |
| 4,535,230 | 8/1985 | Brieu | 219/470 |
| 4,547,141 | 10/1985 | Ruschmann | 425/374 |
| 4,614,565 | 9/1986 | Riihinen | 29/116.2 |
| 4,627,176 | 12/1986 | Brieu | 219/470 |
| 4,673,345 | 6/1987 | Andersson | 425/174.8 |
| 4,757,582 | 7/1988 | Verkasalo | 29/116.2 |

FOREIGN PATENT DOCUMENTS 49209 9/1979 Japan .
710821 7/1977 U.S.S.R. .

Primary Examiner—Jay H. Woo
Assistant Examiner—James P. Mackey
Attorney, Agent, or Firm—William H. Steinberg; James C. Davis, Jr.; Paul R. Webb, II

[57] ABSTRACT

An apparatus for roll forming of thermoplastic material is provided which employs a pair of rollers having forming surfaces thereon, the pair of rollers defining a gap through which the thermoplastic material is to be passed during the forming operation, the thermoplastic material being dielectrically heated to a softening temperature as it passes between the rollers by a radio frequency electromagnetic field produced between the rollers by activating a radio frequency generator or oscillator which is electrically connected to one of the rollers, the rollers each having conductive portions between which the electromagnetic field is produced.

9 Claims, 2 Drawing Sheets

APPARATUS EMPLOYING INTEGRAL DIELECTRIC HEATER FOR ROLL FORMING THERMOPLASTIC MATERIAL

BACKGROUND OF THE INVENTION

The present invention relates generally to an apparatus for forming plastics and more specifically to an apparatus using dielectric heating in the roll forming of thermoplastics.

Of interest are copending applications Ser. No. 253,836, filed Oct. 5, 1988, entitled "Method and Apparatus for Molding Plastics on Hot Surfaces Using Induction Heating" in the name of B. M. Kim, Ser. No. 135,762, filed Dec. 21, 1987 entitled "Reinforced Composite and Method of Manufacture" in the name of B. M. Kim et al. now U.S. Pat. No. 4,859,524, Ser. No. 253,513, filed Oct. 5, 1988 entitled "Method and Apparatus for Molding Plastics on Hot Surfaces Using Dielectric Heating" in the name of B. M. Kim, Ser. No. 357,829 filed May 30, 1989 entitled "Apparatus for Deforming Plastic Using Local RF Heating" in the name of B. M. Kim et al., Ser. No. 363,237, filed June 8, 1989 entitled "Apparatus and Method for Die Forming Thermoplastic Sheet Material" in the name of Inzinna et al. Ser. No. 401,881, filed Sept. 1, 1989 entitled "Apparatus and Method for Reducing Thermoplastic Material Compression Mold Cycle Time" in the name of B. M. Kim et al., Ser. No. 380,353, filed July 7, 1989, entitled "Apparatus and Method for Deforming Thermoplastic Material Using RF Heating" in the name of Konrad et al., and Ser. No. 379,760, filed July 14, 1989 entitled "Apparatus and Method for Deforming Thermoplastic Material Using RF Heating" in the name of Choi et al. and U.S. Pat. No. 4,818,460, all of the above being assigned to the assignee of the present invention.

DESCRIPTION OF RELATED ART

Thermoplastics are now available which exhibit desirable engineering characteristics heretofore unavailable in other types of plastics. Such thermoplastics, typically referred to as engineering thermoplastics, can be selected to provide high strength, impact resistance, toughness at high temperature and load bearing capabilities. These characteristics make the use of such thermoplastics particularly desirable in applications currently employing less desirable commodity plastics, or sheet metals. Such applications include, for example, large automobile body parts such as hoods, fenders and door panels, and elongated channel members and other elongated sections.

Presently, two general types of processes are in common usage in forming thermoplastics into large parts: injection molding and sheet stamping. Each of these processes has substantial disadvantages with respect to the forming of large thin parts or elongated sections. In the forming of large parts, injection molding processes for thermoplastics are typically limited to parts of less than 600 square inches in surface area. This limitaiton is imposed by enormous clamp down forces which must be applied to mold dies to counteract large forces generated by high injection pressures acting on large part areas.

Sheet stamping processes are limited in their application to thermoplastics by the current lack of knowledge regarding large deformation behavior of the thermoplastics. This lack of knowledge regarding the large deformation behavior of thermoplastics makes it difficult to consistently produce large, high quality thermoplastic parts using currently available sheet stamping processes. Thus, such sheet stamping processes are currently limited to thermoplastic parts substantially smaller in size, for example, than those required to manufacture automobile body panels.

U.S. Pat. Application Ser. No. 087,053, filed Aug. 18, 1987, now U.S. Pat. No. 4,818,460, and assigned to the assignee of the present invention, discloses a method and apparatus for forming thermoplastic sheets having relatively complex curves using a traveling roller in combination with a stationary mold form. The roller forming method described in that application substantially overcomes the aforementioned disadvantage where discrete sheets of thermoplastic material are required to be formed, but nevertheless has the disadvantage that the apparatus does not appear to be well-suited for substantially continuous processing and forming of elongated members.

Roll forming of thermoplastic materials, using pairs of rollers having deformation or forming surfaces, promises to provide improved methods for the forming of such materials into desired end products. Unlike various well known processes for roll forming of metals, the thermoplastic material to be formed must be heated and the temperature maintained within a fairly closely controlled temperature range wherein the material is softened such that it is capable of being deformed without cracking, that temperature being in the neighborhood of the glass transition temperature of the thermoplastic. However, the required temperature control has been difficult to achieve in previous attempts to process and form thermoplastics. Such previous attempts have employed heaters to heat the material prior to being introduced into a gap between the metal rollers, however, the material quickly loses heat upon contact with the rollers. The loss of heat to the rollers makes the task of deforming the thermoplastic material considerably more difficult, a problem which is amplified in processes where it is desired to pass the thermoplastic material through a plurality of roll stations. Providing a heater at the entrance to each of the roll stations is not a fully satisfactory solution due to the cooling of the material upon contact with each set of rollers.

OBJECTS AND SUMMARY OF THE INVENTION

It is a primary object of the present invention to provide a roll forming apparatus which facilitates the forming of thermoplastic strip and sheet material by providing a heating means for heating the material as it passes through a pair of forming rollers.

An additional object of the present invention is to provide pairs of rollers adapted to heat a thermoplastic material to a softening temperature as the material passes between and through the rollers.

The above and other objects of the present invention are accomplished by providing a roll former for bending or otherwise deforming a thermoplastic material, the roll former having at least one pair of rollers which are adapted to produce a dielectric heating of the material as it passes between the pair of rollers. Dielectric heating is a well known phenomena, and radio frequency (RF) heaters are commercially available for heating thermoplastic and thermosetting polymers. The dielectric heating is produced by establishing an electric potential between the rollers, each of the rollers having at least one predetermined region which is electrically conductive, using a radio frequency (RF) generator or oscillator. The RF generator or oscillator produces an electromagnetic excitation field between the conductive region of the rollers which generates heat in the thermoplastic material to soften the material as it passes between the rollers.

The dielectric heating produced at the rollers will be concentrated at critical locations where the bending or deformation of the thermoplastic is to occur. In addition to facilitating the bending of the material at these locations, this concentration of the heating has the additional advantage that the portions of the material which are not to be deformed remain at relatively cool temperatures. Further enhancement of the concentration of the heating may be effected by constructing one of the pair of rollers from a plurality of disks some of which are made of a conductive material and some of which are made of an insulative material. A roller thus constructed would have alternating conductive and insulative disks, and the heating will be further concentrated at the area where the conductive disks are present.

In an apparatus where more than one pair of rollers is used in forming the thermoplastic material, each pair of rollers, or roll station, may be equipped to provide dielectric heating of the material, and the heating can be accurately controlled by controlling the power levels of the RF generator at each roll station. It is also possible to sequentially boost the thermal energy in the plastic as it advances to subsequent roll stations through the roll forming machine.

BRIEF DESCRIPTION OF THE DRAWINGS

These and other features of the present invention and the attendant advantages will be readily apparent to those having ordinary skill in the art and the invention will be more easily understood from the following detailed description of the preferred embodiments of the present invention, taken in conjunction with the accompanying drawings wherein like reference characters represent like parts throughout the several views, and wherein.

DETAILED DESCRIPTION OF THE INVENTION

Figure 1:
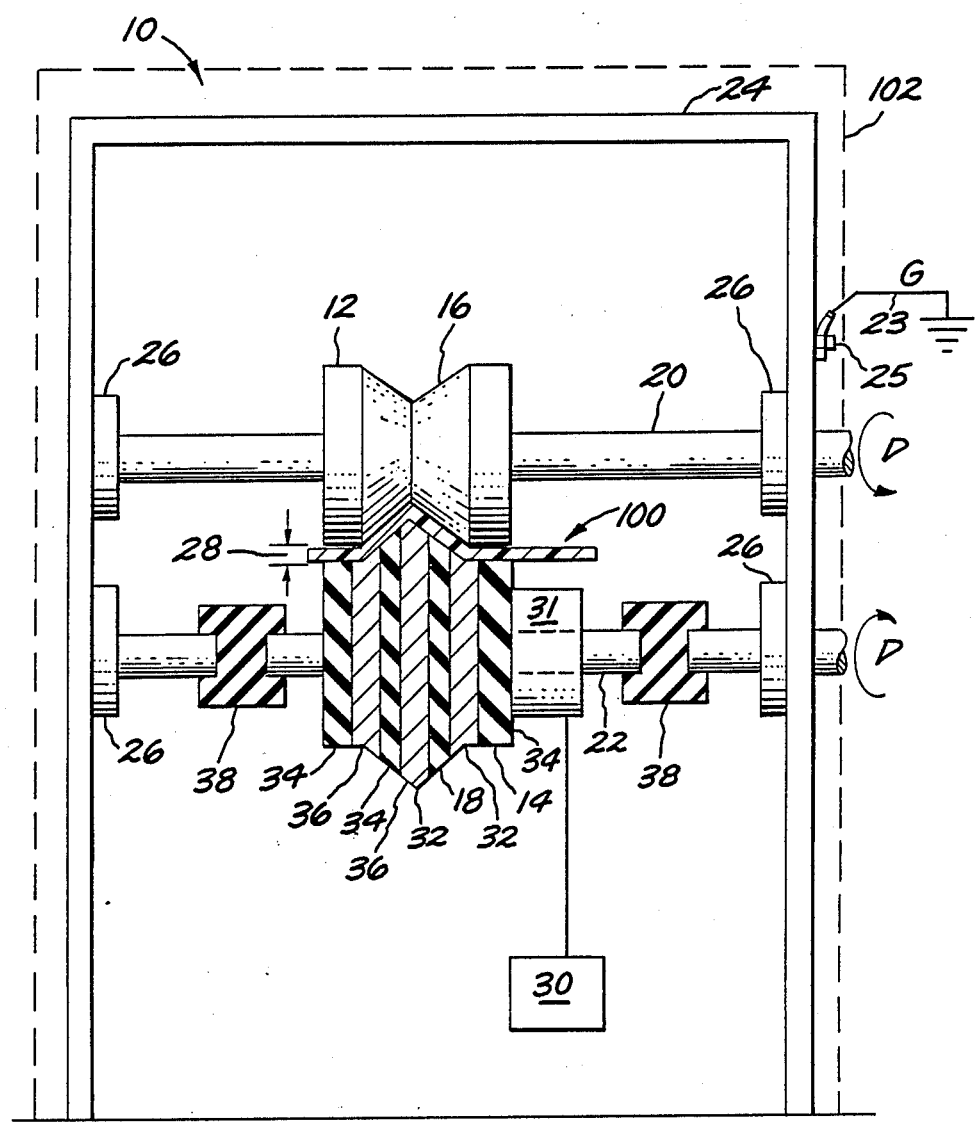
FIG. 1 depicts an elevation view of the roll station according to a preferred embodiment of the present invention, with some components shown in cross-section.

Referring initially to FIG. 1, a roll station according to a preferred embodiment of the present invention is indicated generally at numeral 10. Portions of this roll station 10 are depicted in substantially schematic form. A first, or upper roller 12 and a second, or lower roller 14 having complementary exterior forming surfaces 16 and 18, respectively, are disposed on upper rotating shaft 20 and lower rotating shaft 22. Upper shaft 20 and lower shaft 22 are themselves secured to a frame 24, depicted in substantially schematic form in FIG. 1, the securing means 26 permitting only axial rotation of the shafts. The upper roller 12 and lower roller 14 are thus fixed in position having a gap or nip 28 therebetween of a desired dimension and geometry. The rollers 12 and 14 being thus configured are adapted to act as load bearing surfaces for the forming of the thermoplastic material. Drive means (not shown) for rotating the upper and lower shafts 20 and 22, will be provided and many known, commercially available devices may be suitable for use in this apparatus. Drive arrows "D" are provided to indicate that the rollers will be driven such that they are moving in the same direction at gap 28.

As depicted, the gap is preferably of substantially constant dimension, closely corresponding to the thickness of the thermoplastic workpiece 100 which is to be deformed. The forming surfaces 16 and 18, in the depicted embodiment are adapted to impart an inverted chevron-shaped raised section in the otherwise planar workpiece 100. It is to be understood, however, that the invention is not limited to roll formers for producing only this depicted shape, but rather it is envisioned that the rollers and roll former of the present invention may be configured to produce a wide variety of cross-sectional shapes, and to handle various types of thermoplastic material of varying thicknesses.

Upper roller 12 is made of a solid conductive material, preferably a conductive metal, which is grounded via shaft 20 and frame 24, ground "G" being shown schematically and established by conductor 23 connected to post 25 on frame 24. Lower roller 14 is also conductive and is electrically connected to radio frequency generator shown schematically at 30. The electrical connection may be effected in any of several conventional ways, the depicted embodiment employing a slip-ring rotary power commutator 31 which is adapted to conduct electricity to lower roller 14 via electrical brushes to conductive shaft 22. Such devices are commercially available, and are commonly referred to as slip rings, manufactured by, for example, Lebow. Other suitable means for electrically connecting the roller 14 to the RF generator 30 may be employed as well. When the generator or oscillator 30 is energized, an electromagnetic field is created between the rollers 12 and 14. Dielectric heating, in general, occurs when a dielectric, non-conductive material, such as a thermoplastic sheet or strip, is exposed to certain electric fields, such as the one created between upper and lower rollers 12 and 14, when the RF generator 30 is activated. Heating is induced in the material by oscillation of the field through the thermoplastic, creating excitation and internal molecular friction, effecting a temperature rise in the material. A typical commercial dielectric heating device operates at 100 MHz, a frequency set aside for such heaters by the F.C.C., and will typically have a maximum power output on the order of 10 kilowatts. The temperature rise in the material can readily approach the softening temperature of the material, for most envisioned materials in the range of 300°–380° F., using a dielectric heater of this type. The RF generator 30 of the present invention will have a maximum power output in this same range.

The electric field created between the rollers, and thus the heating of the thermoplastic, will be concentrated at sharp points on the rollers 12 and 14, primarily due to the effect of the geometry of the rollers on the electric field. Generally, these sharp points or bends 32 are also the locations where an incoming plastic sheet is to be subjected to the maximum amount of bending or deformation. This field concentrating effect may be advantageously further enhanced by providing a lower roller 14 which is not made of a solid conducting material, but rather of alternating disks of electrically insulative material and electrically conductive material, this embodiment being shown in cross-section in FIG. 1.

The cross-section view of roller 14 is FIG. 1 shows that insulative disks 34 are disposed at regions which are not pointed or angled within the region and do not have surfaces which change in direction in the region. Conductive disks 36 are disposed in such regions, and thus, when the RF generator is energized, the commutator 31 and conductive shaft 22 send power to the conductive disks 36, the conductive shaft being in contact with conductive disks at the center of the roller, generating the field in the gap 28 between rollers 12 and 14 at primarily and substantially exclusively the regions where the conductive disks 36 are located. As no electric field is established in the regions where insulative disks 34 face upper roller 12, the portions of the thermoplastic material 100 passing through the rollers 12 and 14 in these regions will remain relatively cool. Concentrating the heating at the sections of the material to be deformed has the advantages that energy may be conserved as the entire sheet of material is not required to be heated, and that the cooler portions of the sheet will maintain at least a limited amount of structural integrity, facilitating the transport of the sheet 100 after it has passed between rollers 12 and 14.

The lower shaft 22, to which the power is supplied, may advantageously employ electrical insulators shown schematically at 38 which electrically isolate the roller 14 from the outer portion of the shaft in contact with frame 24. This isolation may be necessary to prevent shorts and electrical arcing, depending on the exact configuration of the roll station and RF generator circuitry. Additionally, the roll station 10, or the plurality of roll stations where more than one is employed, is preferably enclosed in a screen or shielded cabinet 102, shown in broken lines in FIG. 1, in accordance with F.C.C. regulations.

Figure 2:
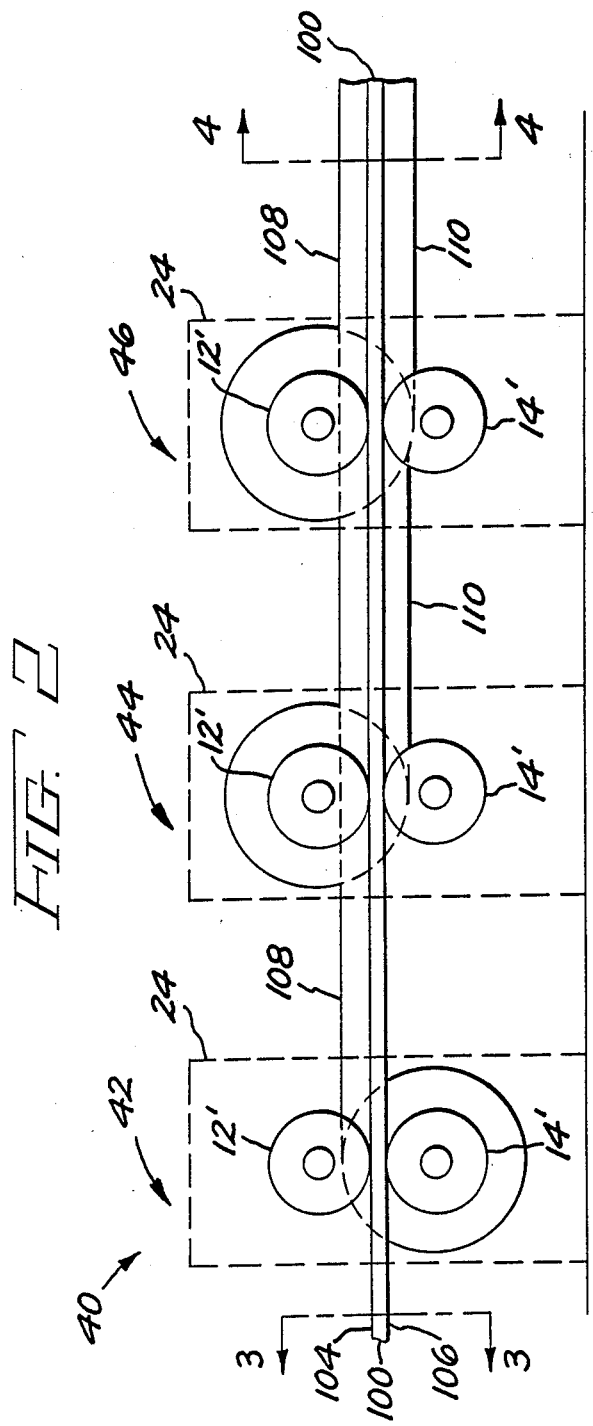
FIG. 2 is a diagrammatic side elevation view of a roll forming apparatus according to the present invention.
Figure 3:
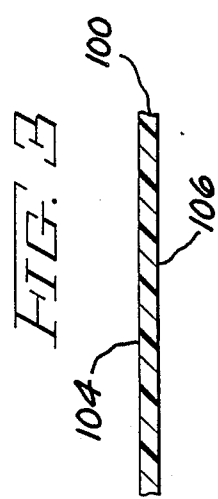
FIG. 3 is a cross-sectional view, taken along section line 3—3 of FIG. 2 of the thermoplastic material prior to processing.

FIG. 2 depicts, diagrammatically, a roll forming apparatus 40 having a plurality of roll stations 42, 44, 46, each of which may be configured in a manner similar to the roll station embodiment of FIG. 1. The thermoplastic material 100 to be formed may be in sheet or strip form, depending on the desired end product, and may be fed substantially continuously through the roll forming apparatus either as elongated discrete pieces of sheet or strip material, or as a substantially continuous feed stock fed from a roll (not shown) of the material. As the thermoplastic 100 enters the roll forming apparatus from the left side of FIG. 2, the material has substantially planar and parallel upper and lower surfaces 104 and 106 as can be seen in the cross-sectional view of the material in FIG. 3.

The material entering first roll station 42 need not be heated prior to being passed between the rollers 12' and 14', although providing a limited amount of preheat by an external heater may be found to be advantageous in certain forming processes. The feed stock 100 enters the gap 28 (FIG. 1) between rollers 12' and 14', and is heated by the electromagnetic energy field created between the rollers by the RF generator electrically connected thereto.

Figure 4:
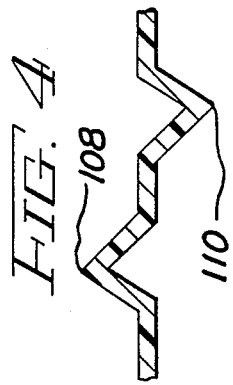
FIG. 4 is a cross-sectional view, taken along section line 4—4 of FIG. 2, of the thermoplastic material after exiting the roll forming apparatus.

The rollers of first roll station 42 in FIG. 2 may be configured to produce an upper crease 108 in the thermoplastic material, which can be seen in the cross-section view of FIG. 4 as well. As an indication that bends may be produced in the material in more than one direction, the schematically represented second roll station 44 may have rollers configured to produce a lower crease 110 (see also FIG. 4) in the material as it is passed between this pair of rollers. Roll station 46 is intended to represent a pair of rollers which may be configured to make the lower crease 110 (FIG. 4), formed initially at roll station 44, of increased depth and of more sharply angled cross-section. The cross-sectional shape of the exemplary resulting structure as it exits the roll forming apparatus 40 may be seen in FIG. 4.

Because in the present apparatus the material is heated as it passed between the rollers, the problems associated with the heating and subsequent heat loss of the thermoplastic material to the rollers are substantially eliminated. Where more than one roll station is used in forming a final product, providing each roll station with integral dielectric heating means according to the present invention presents further advantages in processing. Control of the temperature of the material between roll station is far less critical using such an apparatus because very accurate control at each roll station may be accomplished by controlling the power levels of the RF generator at each station. As indicated previously, the unheated, cooler portions of the material exiting each of the roll stations will provide increased rigidity in the structure, facilitating transport between roll stations. Additionally, the integral dielectric heaters at the plurality of roll stations may be employed, through control of the power levels of the RF generator at each station, to sequentially boost the thermal energy present in the material being processed as it advances through the apparatus.

Although the apparatus has been described thus far for use in the bending or forming of a thermoplastic material, the apparatus may be employed as well in roll forming of fiber-reinforced thermoplastic materials, sometimes referred to as "thermoplastic composite" materials, for example glass fiber-reinforcement. The working temperatures to which the integral dielectric heaters must heat the thermoplastic composites are generally higher than those required to form an unreinforced thermoplastic. Examples of candidate materials which may be roll formed in the present apparatus include polycarbonates, polybutylene terephthalate, and a blend of bisphenol-A-polycarbonate and polybutylene terephthalate, available from General Electric Company as Lexan, Valox and Xenoy, respective, all of which are registered trademarks of the General Electric Company These materials may be in either fiber-reinforced or unreinforced form.

Although various specific arrangements have been described herein, it is to be understood that these are for illustrative purposes only. Various modifications and adaptations will be apparent to those of skill in the art. Accordingly, the scope of the present invention should be determined by reference to the appended claims.

What is claimed is:

1. Apparatus for roll forming a thermoplastic material comprising:
    a first rotatable roller having a forming surface, at least a portion of said first roller being electrically conductive;
    a second rotatable roller having a forming surface, at least a portion of said second roller being electrically conductive, said second roller having a plurality of conductive disks spaced apart by a plurality of insulative disks, said first and second rollers being spaced apart and forming a gap therebetween, said first and second rollers being adapted to receive a thermoplastic material to be roll formed in said gap; and a radio frequency generator means electrically connected to said second roller for application of a radio frequency electromagnetic field across said gap between said conductive portions of the first and second rollers for dielectric heating thermoplastic material exposed to said field between said rollers to a softening temperature.

2. Apparatus as defined in claim 1 wherein said first roller is rotatably mounted to a frame by a first shaft made of a conductive material, and said second roller is rotatably mounted to a frame by a second shaft made of a conductive material.

3. Apparatus as defined in claim 2 wherein said second shaft is electrically connected to said radio frequency generator means, and said second shaft conducts an output of said radio frequency generator means to said conductive disks of said second roller.

4. Apparatus as defined in claim 3 wherein said second roller and a section of said second conductive shaft adjacent said second roller are electrically insulated from said frame.

5. Apparatus as defined in claim 3 wherein said apparatus includes a slip ring commutator surrounding said second shaft at a position adjacent to said second roller, said slip ring commutator being electrically connected to said radio frequency generator means.

6. Apparatus for roll forming a thermoplastic sheet material comprising:

a first roll station, said first roll station further comprising:

a first conductive roller and a second conductive roller, said first and second conductive rollers being rotatably mounted to a first frame means at a substantially fixed, spaced apart distance by a first and second shaft means, said second conductive roller comprising a plurality of conductive disks disposed on said second shaft transverse to an axis of rotation of said shaft, said plurality of conductive disks being spaced apart on said second shaft, said second conductive roller further comprising insulative disks disposed between adjacent ones of said plurality of conductive disks, said first roller having a first forming surface, said first forming surface having at least one angled portion, said second roller having a second forming surface, said second forming surface having a complementary angled portion, said angled portions of said first and second rollers being adapted to produce a bend in said thermoplastic sheet material when said thermoplastic sheet material is heated, said first and second forming surfaces defining a gap between said first and second rollers through which said thermoplastic sheet material is to be passed; and radio frequency generating means for application of a radio frequency electromagnetic field between said first and said second rollers, said radio frequency generating means being electrically connected to one of said first or second rollers, said electromagnetic field causing at least a portion of said thermoplastic sheet material to be heated to a softening temperature as said sheet material is passed through said electromagnetic field.

7. Apparatus as defined in claim 6 wherein said conductive disks are disposed at regions of said second roller where bends are to be produced in said thermoplastic material.

8. Apparatus for roll forming an elongated section of thermoplastic material comprising:

roller means for producing at least one bend in said thermoplastic material, said roller means having forming surfaces defining a gap through which said thermoplastic material is to be passed, said roller means to be adapted to pass said thermoplastic material therethrough in a substantially continuous manner, said roller means having at least a first and second conductive portion on opposing sides of said gap at a region where said at least one bend is to be produced, said roller means comprising at least a first and a second roller, said first roller having a first forming surface extending over a portion thereof, said second roller having a second forming surface extending over a portion thereof, said rollers being spaced apart defining said gap, and wherein said first conductive portion of said roller means being located on said first forming surface and said second conductive portion of said roller means being located on said second forming surface, said second roller having a conductive shaft extending therethrough, said shaft being rotatably secured to a frame means, and said second roller comprising a plurality of alternating conductive and insulative disks oriented transversely to said shaft axis; and a radio frequency oscillator electrically connected to said conductive shaft, said radio frequency oscillator being adapted to produce a radio frequency electromagnetic field across said gap between said first and said second conductive portions of said roller means, said electromagnetic field causing a portion of said thermoplastic material exposed to said field to be heated to a softening temperature as said thermoplastic material is passed through said gap in said roller means.

9. Apparatus as defined in claim 8 wherein at least one of said conductive disks is disposed at a region where said at least one bend is to be produced in said thermoplastic material.

* * * * *